(12) United States Patent
Cahill et al.

(10) Patent No.: US 10,223,706 B1
(45) Date of Patent: *Mar. 5, 2019

(54) SYSTEM FOR MEASURING A PLURALITY OF TAGGED ASSETS ON A PLURALITY OF PHYSICAL ASSETS

(71) Applicant: UTEC SURVEY, INC., Houston, TX (US)

(72) Inventors: David Patrick Cahill, Livingston (GB); Gregory Hammond, Livingston (GB)

(*) Notice: Subject to any disclaimer, the term of this patent is extended or adjusted under 35 U.S.C. 154(b) by 467 days.

This patent is subject to a terminal disclaimer.

(21) Appl. No.: 15/081,577

(22) Filed: Mar. 25, 2016

Related U.S. Application Data

(63) Continuation-in-part of application No. 14/601,495, filed on Jan. 21, 2015, now abandoned.

(60) Provisional application No. 61/929,848, filed on Jan. 21, 2014.

(51) Int. Cl.
| | |
|---|---|
| *G06Q 10/06* | (2012.01) |
| *G06F 3/0481* | (2013.01) |
| *G06Q 30/02* | (2012.01) |
| *G06F 3/0482* | (2013.01) |
| *G06F 17/30* | (2006.01) |
| *G06F 3/0484* | (2013.01) |

(52) U.S. Cl.
CPC ....... *G06Q 30/0201* (2013.01); *G06F 3/0482* (2013.01); *G06F 3/04817* (2013.01); *G06F 3/04842* (2013.01); *G06F 17/30268* (2013.01); *G06F 17/30876* (2013.01)

(58) Field of Classification Search
CPC ........................ G06Q 10/087; G06Q 10/063
See application file for complete search history.

(56) References Cited

U.S. PATENT DOCUMENTS

| | | | |
|---|---|---|---|
| 9,165,272 B1 * | 10/2015 | Brown | G06Q 10/063 |
| 9,262,048 B1 * | 2/2016 | Brown | G06Q 90/00 |
| 9,262,740 B1 * | 2/2016 | Brown | G06Q 10/087 |
| 2002/0099456 A1 | 7/2002 | McLean | |
| 2005/0132305 A1 | 6/2005 | Guichard et al. | |
| 2006/0015777 A1 | 1/2006 | Loda | |
| 2009/0326694 A1 | 12/2009 | Stephens | |
| 2010/0114493 A1 | 5/2010 | Vestal | |
| 2010/0223163 A1 | 9/2010 | Edwards | |
| 2012/0019522 A1 | 1/2012 | Lawrence | |
| 2012/0046978 A1 | 2/2012 | Cartwright | |
| 2013/0297633 A1 | 11/2013 | Edwards | |

* cited by examiner

*Primary Examiner* — Talia F Crawley
(74) *Attorney, Agent, or Firm* — Buskop Law Group, P.C.; Wendy Buskop

(57) ABSTRACT

A system for monitoring at least one of tagged asset on at least one physical asset using a processor and data storage connected to a network, with at least one connected client device. The system displays at least one tagged asset from at least one independent survey set up on a layered coordinate system view with icons. The at least one independent survey set up can have at least one data capture device, such as a laser scanner, a camera, or both, a processor with data storage, and a receiver/transmitter enabling a user to link icons to a 360 degree panoramic view, which enables a user to view a visual representation of at least one tagged asset and connect to a library of tagged assets.

17 Claims, 14 Drawing Sheets

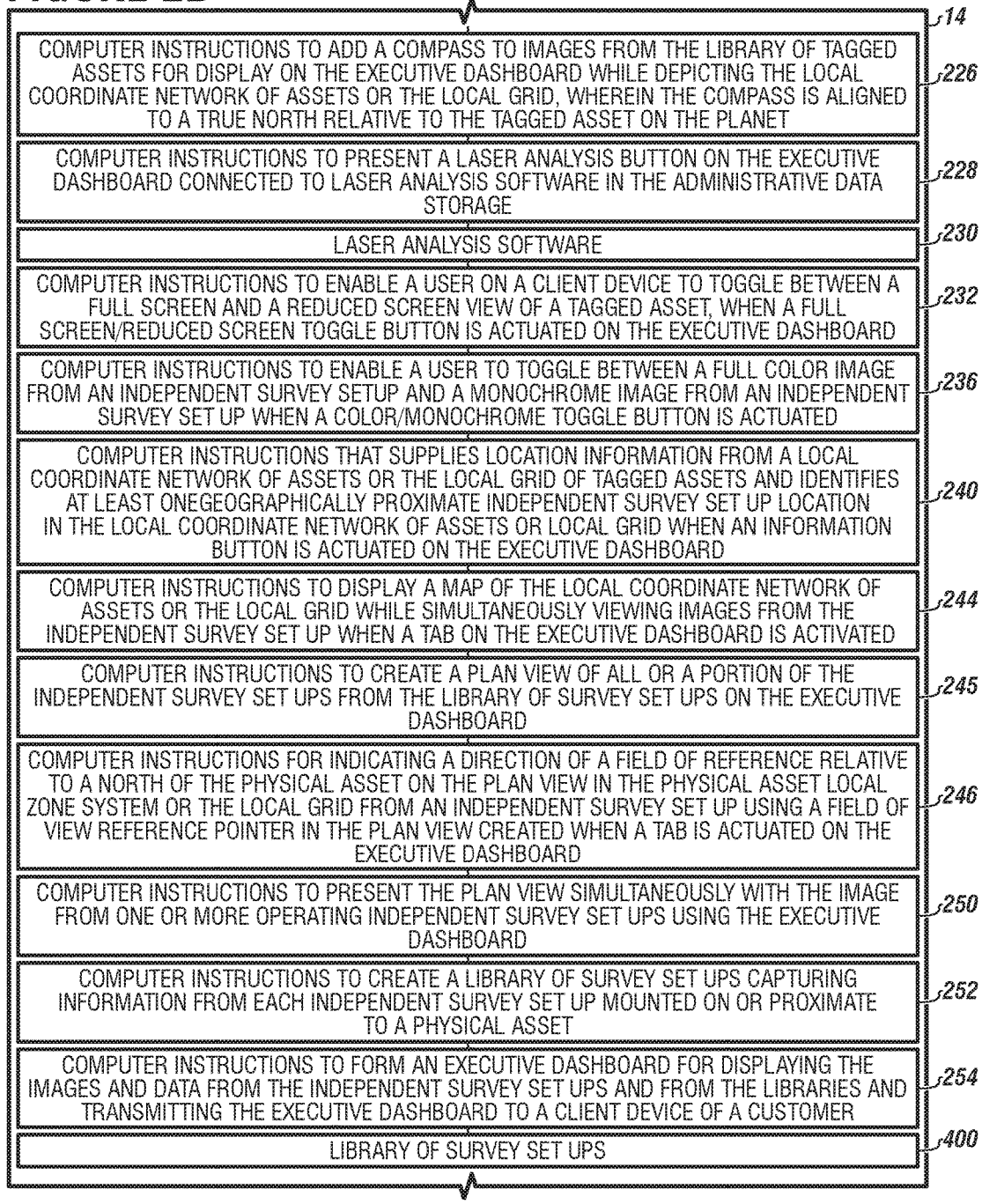

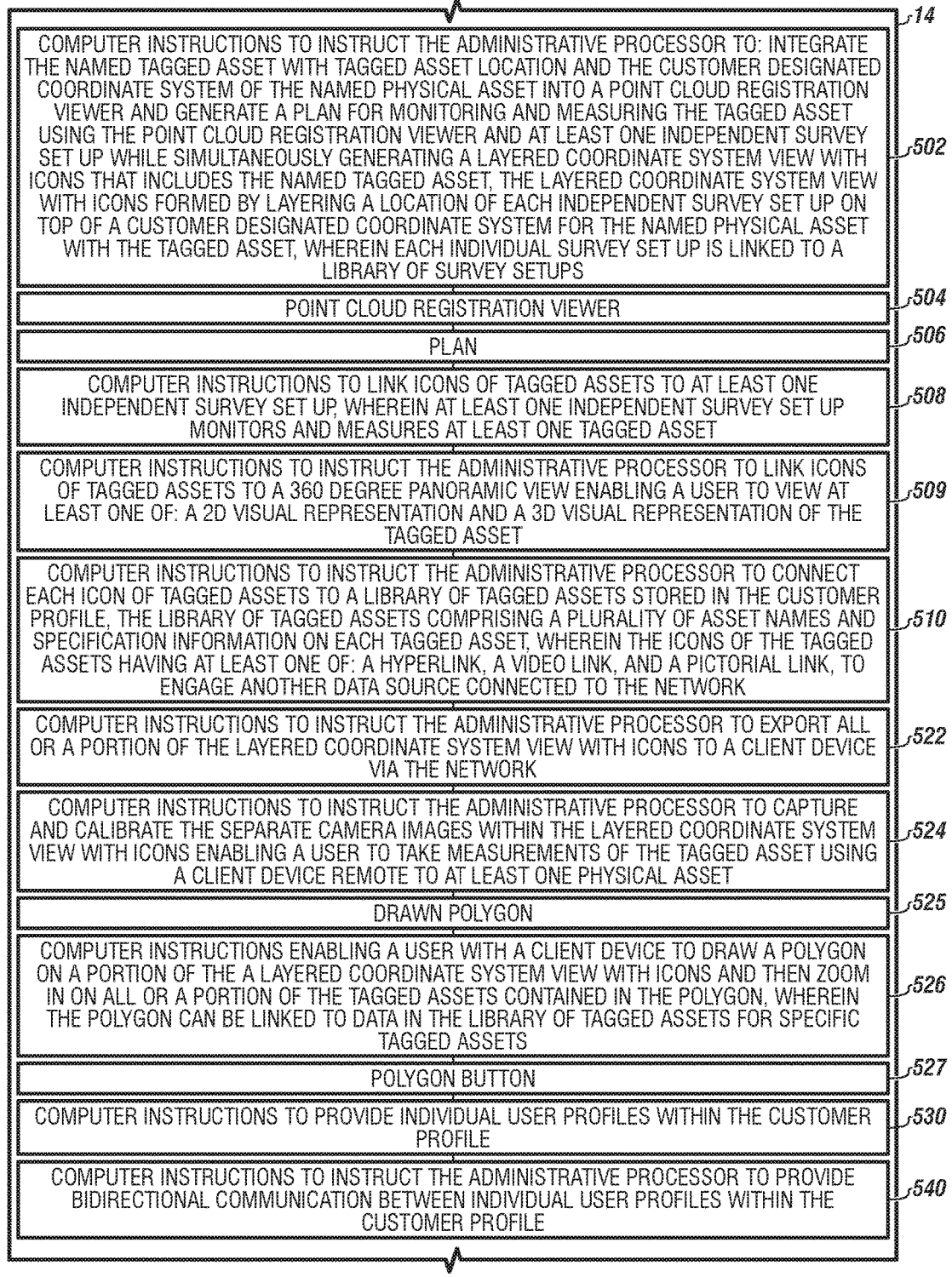

FIGURE 3A

| | |
|---|---|
| CUSTOMER PROFILE | 22 |
| CUSTOMER NAME | 302 |
| CUSTOMER BILLING ADDRESS | 304 |
| SURVEY DATE | 306 |
| CUSTOMER USER IDENTIFICATION | 308 |
| CUSTOMER PASSWORD | 310 |
| CUSTOMER SECURITY QUESTION AND AN ANSWER | 312 |
| NAMED PHYSICAL ASSET | 314 |
| TAGGED ASSET LOCATION | 315 |
| GLOBAL POSITIONING SYSTEM COORDINATES FOR THE NAMED OR CODED PHYSICAL ASSET | 316 |
| CUSTOMER PROVIDED ORIGIN | 318 |
| QUANTITY OF INDEPENDENT SURVEY SET UPS ON THE PHYSICAL ASSET | 319 |
| PHYSICAL ASSET LOCAL ZONE SYSTEM | 320 |
| LIBRARY OF TAGGED ASSETS | 322 |
| ICON | 323 |
| HYPERLINK | 33 |
| VIDEO LINK | 34 |
| PICTORIAL LINK | 35 |
| PLURALITY OF TAGGED ASSETS | 324 |
| ASSET ADDRESSES FOR EACH ASSET NAMED USING THE GLOBAL POSITIONING SYSTEM | 326 |
| ASSET ADDRESS FOR EACH TAGGED ASSET AS POSITIONED IN THE PHYSICAL ASSET LOCAL ZONE SYSTEM OR THE LOCAL GRID | 328 |
| ASSET ELEVATION ABOVE A MEAN SEA LEVEL | 330 |
| ASSET LOCATION BELOW A MEAN SEA LEVEL | 332 |
| ASSET DESCRIPTION | 333 |
| CUSTOMER DESIGNATED COORDINATE SYSTEM | 334 |
| LOCAL GRID | 335 |
| NAMED TAGGED ASSET | 350 |
| TAGGED ASSET LOCATION | 352 |
| SPECIFICATION INFORMATION | 399 |
| DRAWN POLYGON | 525 |
| INDIVIDUAL USER PROFILES | 532 |
| USER NAME | 534 |
| ACCESS RESTRICTION | 536 |
| CONTACT INFORMATION | 538 |

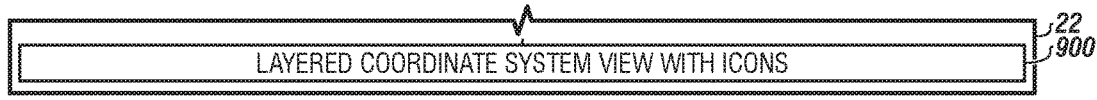

| | |
|---|---|
| LIBRARY OF SURVEY SET UPS | 400 |
| INDEPENDENT SURVEY SET UP IDENTIFIERS | 402 |
| INDEPENDENT SURVEY SET UP DATA CAPTURE DEVICE CODES | 404 |
| TRANSMISSION CONNECTION DESCRIPTIONS | 406 |
| INFORMATION ON A TIME LINE OF THE DATA CAPTURE DEVICE | 408 |
| CUSTOMER NAME | 302 |
| PHYSICAL ASSET NAME OR CODE | 314 |
| AN ADDRESS OF THE INDEPENDENT SURVEY SET UP IN THE PHYSICAL ASSET LOCAL ZONE SYSTEM OR THE LOCAL GRID | 420 |
| AT LEAST ONE OF A LIVE VIDEO FEED, A STORED VIDEO FEED, STILL PHOTOS OF THE TAGGED ASSET, AND SONAR OF THE TAGGED ASSET | 422 |
| LASER INFORMATION ON LASERS USED IN INDEPENDENT SURVEY SET UPS | 424 |
| AT LEAST TWO AND POSSIBLY THREE X, Y, AND Z COORDINATES LOCATING THE INDEPENDENT SURVEY SET UP IN THE PHYSICAL ASSET LOCAL ZONE SYSTEM OR THE LOCAL GRID | 426 |
| SOURCES OF POWER SUPPLY FOR EACH INDEPENDENT SURVEY SET UP ON THE PHYSICAL ASSET | 428 |
| JOB PROJECT NAME | 430 |
| EQUIPMENT SPECIFICATIONS ON DATA CAPTURE DEVICES USED IN INDEPENDENT SURVEY SET UPS | 432 |
| SEMI-TEMPORARY TARGETS IDENTIFIED FOR ESTABLISHING THE LOCATION OF THE TAGGED ASSET IN THE PHYSICAL ASSET LOCAL ZONE SYSTEM OR THE LOCAL GRID | 434 |
| SUPPORT DEVICE INFORMATION ON EQUIPMENT USED TO SUPPORT THE DATA CAPTURE DEVICE | 436 |
| DISTANCE THE INDEPENDENT SURVEY SET UP IS FROM THE PHYSICAL ASSET | 438 |

FIGURE 7A

| | |
|---|---|
| CREATING A CUSTOMER PROFILE WHICH IS STORED IN THE ADMINISTRATIVE DATA STORAGE OR IN A CLOUD COMPUTING DATA STORAGE | 801 |
| PROVIDING A PHYSICAL ASSET NAME AND PHYSICAL ASSET ADDRESS FOR A PHYSICAL ASSET TO BE SURVEYED | 803 |
| IDENTIFYING A CUSTOMER PROVIDED ORIGIN ON THE PHYSICAL ASSET FOR SURVEYING | 805 |
| IDENTIFYING AREAS OF THE PHYSICAL ASSET FOR MONITORING, SUCH AS SURVEYING | 807 |
| USING AN EXECUTIVE DASHBOARD CREATED USING COMPUTER INSTRUCTIONS IN THE ADMINISTRATIVE DATA STORAGE, TO REQUEST SURVEYING AND MONITORING OF IDENTIFIED PORTIONS OF THE PHYSICAL ASSET WITH THE PHYSICAL ASSET ADDRESS | 809 |
| REQUESTING CREATION AND INSTALLATION OF INDEPENDENT SURVEY SET UPS ON THE PHYSICAL ASSET WHICH TARGET CUSTOMER IDENTIFIED TARGET ASSETS | 810 |
| USING COMPUTER INSTRUCTIONS IN THE ADMINISTRATIVE DATA STORAGE TO INSTRUCT THE ADMINISTRATIVE PROCESSOR TO CREATE A PHYSICAL ASSET LOCAL ZONE SYSTEM FOR THE IDENTIFIED AREAS OF THE PHYSICAL ASSET LOCAL ZONE SYSTEM OR THE LOCAL GRID | 811 |
| USING COMPUTER INSTRUCTIONS IN THE ADMINISTRATIVE DATA STORAGE TO INSTRUCT THE ADMINISTRATIVE PROCESSOR TO IDENTIFY OPTIMUM LOCATIONS TO PLACE INDEPENDENT SURVEY SET UPS WITH DATA CAPTURE DEVICES ORIENTED AT THE CUSTOMER IDENTIFIED TAGGED ASSETS | 812 |
| USING COMPUTER INSTRUCTIONS IN THE ADMINISTRATIVE DATA STORAGE TO INSTRUCT THE ADMINISTRATIVE PROCESSOR TO VERIFY IF INDEPENDENT SURVEY SET UPS ARE AT THE OPTIMUM LOCATIONS OR IF INDEPENDENT SURVEY SET UPS MUST BE MOVED TO DIFFERENT LOCATIONS IN ORDER TO CAPTURE MORE CUSTOMER IDENTIFIED TAGGED ASSETS PROVIDING A MAXIMUM COVERAGE FOR A CUSTOMER IDENTIFIED AREA OF A PHYSICAL ASSET | 813 |
| "TURNING ON", SUCH AS POWERING UP, THE INDEPENDENT SURVEY SET UPS TO PERFORM DATA CAPTURE OF THE CUSTOMER IDENTIFIED TAGGED ASSETS | 814 |
| TRANSFERRING DATA FROM OPERATING INDEPENDENT SURVEY SET UPS TO THE ADMINISTRATIVE DATA STORAGE | 815 |
| GENERATING A LIBRARY OF SURVEY SET UPS USING INFORMATION ON THE INDEPENDENT SURVEY SET UPS AND USING COMPUTER INSTRUCTIONS IN THE ADMINISTRATIVE DATA STORAGE AND STORING THE LIBRARY OF SURVEY SET UPS IN THE ADMINISTRATIVE DATA STORAGE | 816 |
| USING COMPUTER INSTRUCTIONS IN THE ADMINISTRATIVE DATA STORAGE TO INSTRUCT THE ADMINISTRATIVE PROCESSOR TO CREATE A PLAN VIEW OF ALL OR A PORTION OF THE INDEPENDENT SURVEY SET UPS FROM THE LIBRARY OF SURVEY SET UPS CAN BE CREATED | 817 |
| COMPUTER INSTRUCTIONS IN THE ADMINISTRATIVE DATA STORAGE TO INSTRUCT THE ADMINISTRATIVE PROCESSOR TO ENABLE A PLAN VIEW TO BE VIEWED SIMULTANEOUSLY WITH THE DATA FROM ONE OR MORE OPERATING INDEPENDENT SURVEY SET UPS USING THE EXECUTIVE DASHBOARD | 818 |
| USING COMPUTER INSTRUCTIONS IN THE ADMINISTRATIVE DATA STORAGE TO INSTRUCT THE ADMINISTRATIVE PROCESSOR TO FORM A LIBRARY OF TAGGED ASSETS FOR THE SPECIFIC PHYSICAL ASSET BEING SURVEYED WITH THE INDEPENDENT SURVEY SET UPS | 820 |

(7B)

| | |
|---|---|
| UTEC Ref | 1066 |
| Area / Platform Location | Bulk Tanks Area |
| System | Mud & Bulk |
| Equipment Item | Mud Mix & Transfer Systems |
| Description of Non Compliance or Defect | Barite and cement line, approximately 50% of the whole line has coating breakdown. |
| DCR Rating | 2 |
| Action | Fabric Maintenance to be carried out on both lines to re-instate paint coating. This work to be carried out as part of drilling re-activation program before drilling commences in 2013. |
| MCDR No | NN-12-197 |
| Responsible Party | CNR Drilling PE |
| Assigned To | Salamis |
| Required Completion Date | 01/06/2016 |
| Status | Monitor |
| Comments | Not started on 02/03/16 and will now be done post drilling campaign. Managing Director to confirm whether Salamis have already received instruction, possibly expedite to KCAD. |

*FIGURE 11*

SYSTEM FOR MEASURING A PLURALITY OF TAGGED ASSETS ON A PLURALITY OF PHYSICAL ASSETS

CROSS REFERENCE TO RELATED APPLICATIONS

The present application is a Continuation in Part of co-pending application U.S. patent application Ser. No. 14/601,495 filed on Jan. 21, 2015, entitled "COMPUTER INSTRUCTIONS ON COMPUTER READABLE MEDIA FOR MONITORING A PLURALITY OF TAGGED ASSETS ON A PHYSICAL ASSET," which claims priority to and the benefit to U.S. Provisional Patent Application Ser. No. 61/929,848 filed on Jan. 21, 2014, entitled "COMPUTER INSTRUCTIONS ON COMPUTER READABLE MEDIA FOR MONITORING A PLURALITY OF TAGGED ASSETS ON A PHYSICAL ASSET." These references are hereby incorporated in their entirety.

FIELD

The present embodiments generally relate to a system for monitoring and measuring a plurality of tagged assets on a plurality of physical assets simultaneously.

BACKGROUND

A need exists for a system for measuring specific tagged assets on a variety of similar or different physical assets using at least laser scanning with optional cameras and physical sensors, including but not limited to sonar, temperature and pressure sensors, all in real time, and presenting the images and related data to a user with a client device that is remote from the physical assets or on the physical assets, wherein the user can also individually confirm measurements of the tagged assets.

The present embodiments meet these needs.

BRIEF DESCRIPTION OF THE DRAWINGS

The detailed description will be better understood in conjunction with the accompanying drawings as follows:

FIGS. 2A-2D depict the administrative data storage according to one or more embodiments.

FIGS. 3A-3B depict the customer profile in the administrative data storage according to one or more embodiments.

FIG. 4 depicts a library of survey set ups according to one or more embodiments.

FIGS. 7A-7B depict a sequence of steps to implement the system according to one or more embodiments.

FIG. 11 depicts an exemplary memory tag according to one or more embodiments.

Figure 1:
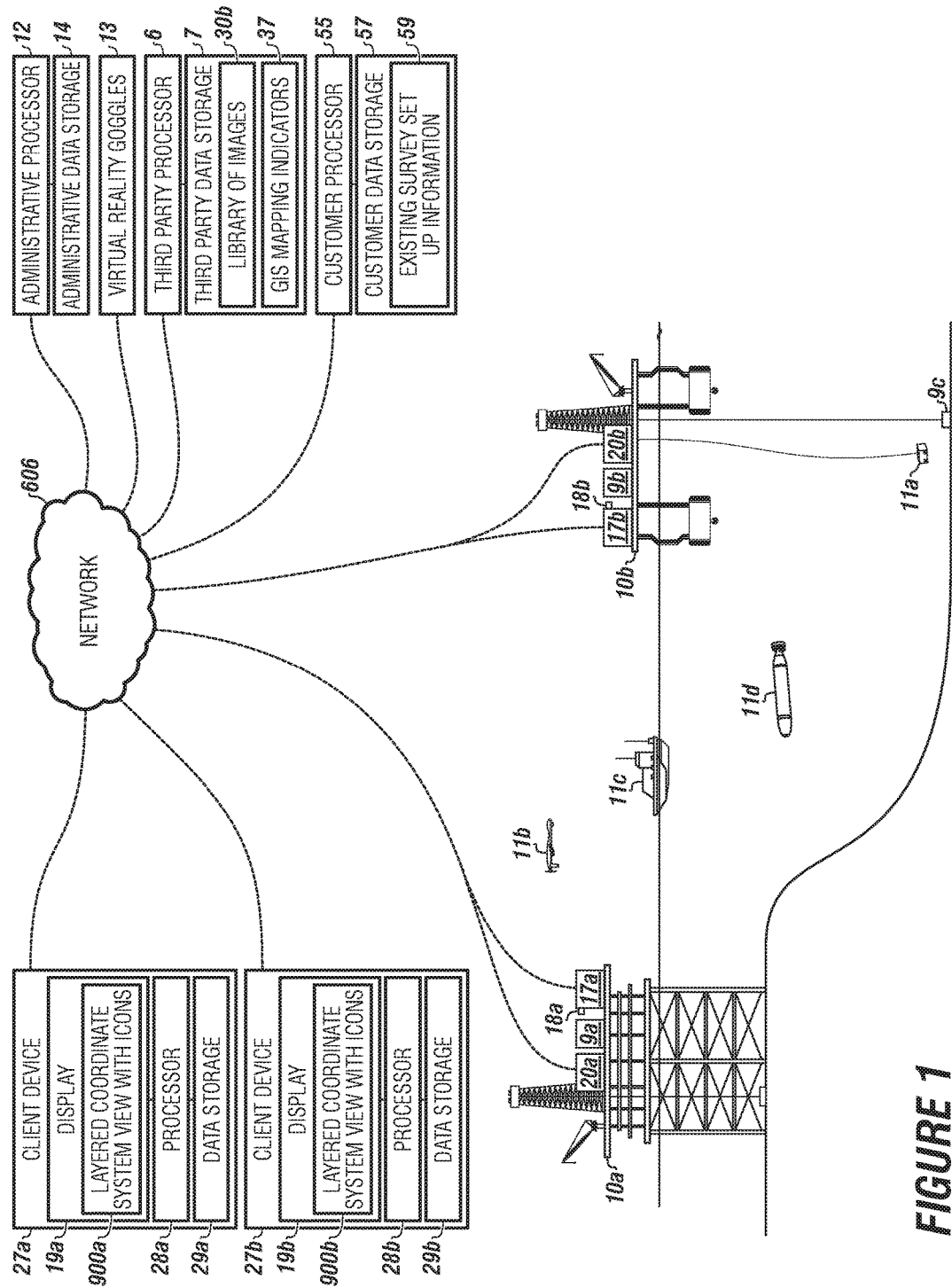
FIG. 1 depicts a diagram of the system according to one or more embodiments.
Figure 2A:
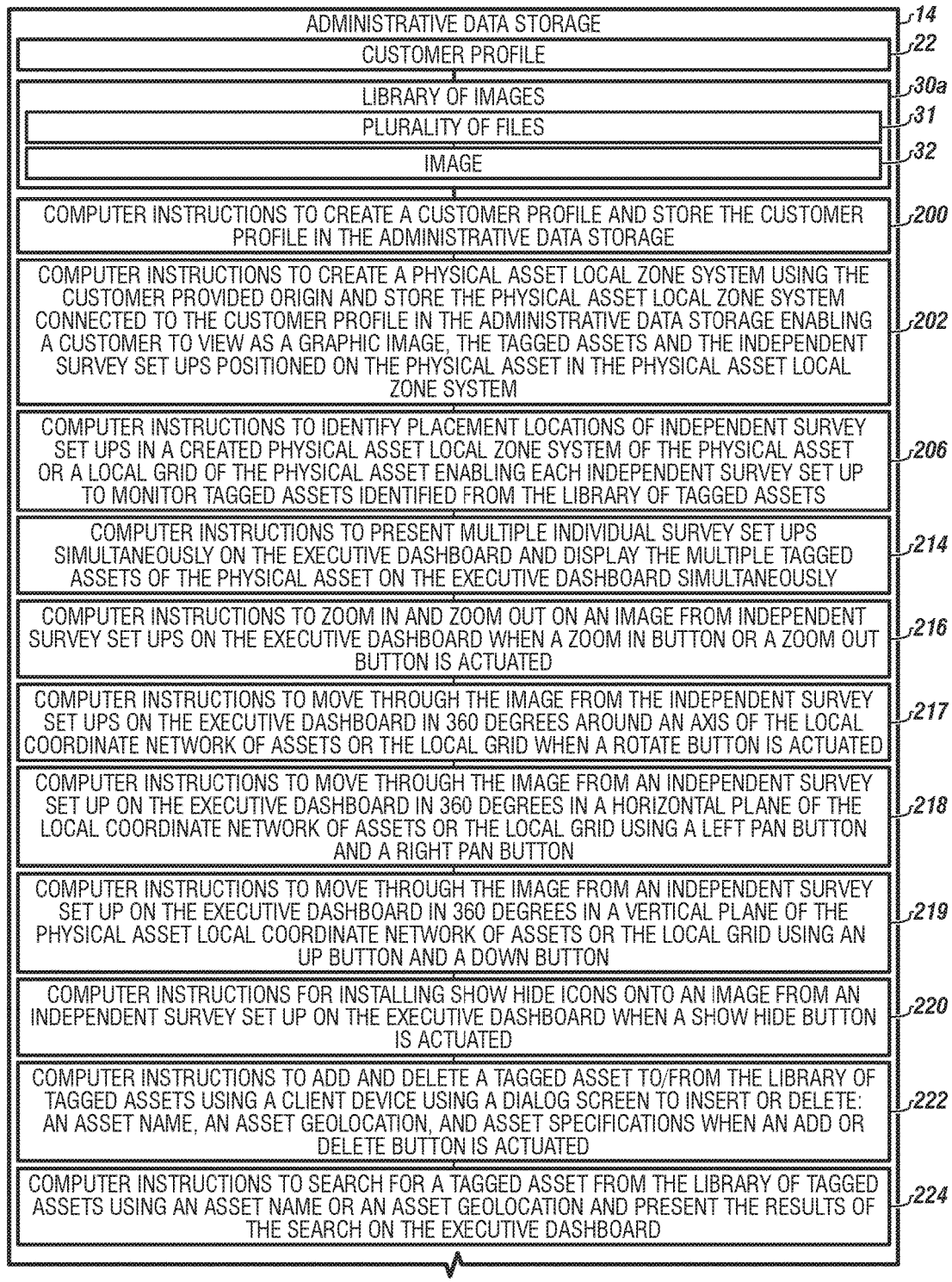
Figure 2D:
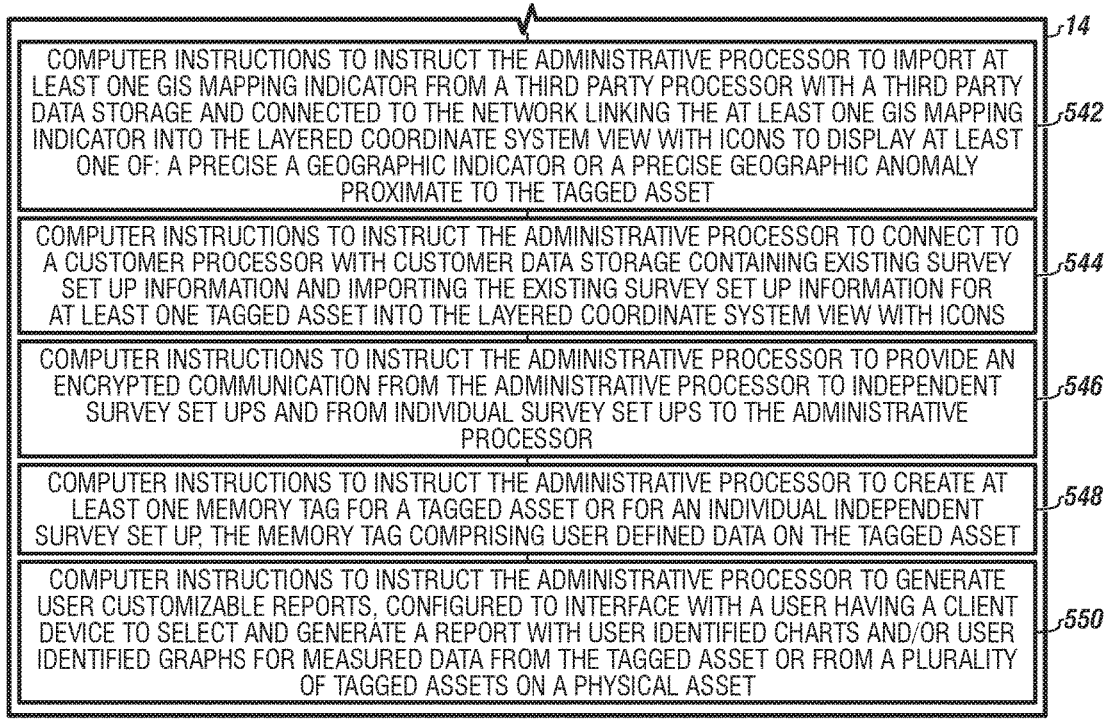

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for monitoring and measuring a plurality of tagged assets on a plurality of physical assets simultaneously.

The present embodiments further relate to an automated system for measuring and monitoring tagged assets on at least one physical asset independently or simultaneously with at least one client devices that enables a user to walk through the at least one physical asset and view the at least one tagged asset from multiple directions.

The system can use a networked administrative processor and administrative data storage, at least one independent survey set up directed to at least one tagged asset, a differential receiver/transmitter, and a layered coordinate system view with icons, which can be constructed from a local grid provided by a customer and overlaid with icons that both accurately and specifically indicate the precise location of the at least one survey set up on the at least one physical asset of and icons that accurately and specifically identify locations of the at least one tagged asset on the at least one physical asset within 0.5 inches to 3 inches of the at least one tagged asset or at least one independent survey set up.

The embodied system can use a library of tagged assets connected to an icon electronically using a variety of links, such as a video link or a hyperlink.

The embodiment system can use a library of images, wherein each icon for at least one independent survey set up can be presented over an image of the at least one tagged asset as taken by at least one independent survey set up.

The embodiments can use a library of survey set ups to identify components on the at least one independent survey set up for a customer.

The system can generate a layered coordinate system view with icons, and an executive dashboard enabling viewing of the layered coordinate system view with icons and various user customized reports on data from the at least one independent survey set up.

The executive dashboard can display received images and information from at least one independent survey set up and information from the library of survey set ups including images, and information from the library of tagged assets and displays icons on an image of the at least one tagged asset.

The client devices can receive and display a layered coordinate system view with icons allowing users to view multiple assets simultaneously, and enable users to walk through and around the at least one tagged asset 360 degrees in a panorama on the at least one physical asset.

In embodiments, the executive dashboard can show each layered coordinate system view with icons for the at least one tagged asset of interest. The executive dashboard can also display a customer name and a physical asset identifier proximate to or on an image of the at least one tagged asset using a virtually positioned icon on the at least one tagged asset.

The embodiments of the system with the layered coordinate system view with icons help prevent death of a worker on the at least one physical asset by providing a status of the at least one physical asset by means of providing a visual image of the work environment and contributing to a safe and effective workplace.

The embodiments of the system help prevent injuries to workers by enabling workers to view and identify in advance of performing work on the at least one physical asset.

The embodiments of the system help prevent injuries by enabling a worker and management to both visually identify trip hazards and initiate risk assessments in advance of future work being carried out on the at least one physical asset.

The embodiments of the system help prevent explosions and fires by identifying areas of highest risk ahead of any maintenance work being carried out.

The embodiments of the system helps prevent environmental harm by providing early detection of exigent hazards that can lead to an environmental disaster.

The term "access restrictions" as used herein can refer to a phrase wherein certain features of the system can have access restrictions added to them so only specific individual user profiles are allowed to view, access, or use the assets, areas or features. The access restrictions can be applied at a client's request.

The term "administrative processor" as used herein can refer to a computer, a laptop, a personal digital assistant, a cellular phone, a tablet computer or similar device capable of processing digital data and presenting digital images. The term can include a plurality of computers connected together, such as cloud computing processing.

The term "administrative data storage" as used herein can refer to a hard drive, cloud based data storage devices connected in parallel or in series, a jump drive, a portable hard drive or combinations thereof.

The term "bi-directional communication" refers to communication over the Internet offering real-time transmission of text messages from sender to receiver. Chat messages are generally short in order to enable other participants to respond quickly. Bi-Directional Communication may address point-to-point communications as well as multicast communications from one sender to many receivers and video chat.

The term "client device" as used herein can refer to a laptop, a computer, a cellular phone, a digital personal assistant, a tablet computer, or various combinations thereof that can receive the images of the at least one independent survey set up on the display of at least one client device.

The term "customer profile" as used herein can refer to a customer name, a customer billing address, a survey date, a customer user identification, a customer password, a customer security question and an answer, physical asset name, global positioning system coordinates for the named physical asset, an asset address in the physical asset local zone system, including a height above or below a water line, and asset specification. Each customer profile can have a library of tagged assets, which includes specifications on the at least one tagged assets. The library of tagged assets for each customer identifies at least one tagged asset on the at least one physical asset to be used in a physical asset local zone system. The customer profile can include addresses and identifications of at least one independent survey set up. Each customer profile can have a link enabling a user to connect to the at least one independent survey set up via a network to view images remotely, such as on client devices like a laptop or cellular phone. Each link can enable a customer to view the at least one tagged assets using at least one independent survey set up in real time, as well as view historic recorded images. Each customer profile can contain information downloaded from each independent survey set up processor and independent survey set up data storage on equipment specifications of the at least one independent survey set up, maintenance records of the at least one survey set up as well as recorded images.

The term "customer provided origin" as used herein can refer to a customer identified "zero," such as a well location, or "well number 1" as a reference point on or proximate to the physical asset. The customer provided origin can include a "local grid" as the term is defined herein.

The term "data capture devices" as used herein can refer to cameras that record video images or sensors that detect temperature and pressure. Data capture devices can include underwater cameras, which can be video or still, and/or laser survey instruments. Data capture devices can include portable laser scanners that can be hand held. Data capture devices can be positioned topside and underwater. Data capture devices can include sonar devices. Data capture devices can be static, such as mounted to a tripod attached to the at least one physical asset or mounted on a moving device. Data capture devices can be mounted to tethered or untethered remotely operated vehicles (ROVs). Data capture devices can be mounted to unmanned aerial vehicles (UAV), such as drones or boats. Data capture device can be mounted to an unmanned surface vehicle (USV) or to an autonomous underwater vehicle (AUV).

The term "existing survey setup" refers to a pre-existing survey set up owned by the customer before creating the layered coordinate system view with icons according the to the system. Each existing survey setup includes: an Individual setup identification (ID), an X-coordinate in the customer provided local zone coordinate system, a Y-coordinate in the customer provided local zone coordinate system, a Z-coordinate in the customer provided local zone coordinate system, a date the existing survey set up was installed on the physical asset, and registered point cloud data and/or an equirectangular panoramic photograph for the existing at least one independent survey setups.

The term "receiver/transmitter" as used herein can refer to a device, which receives and transmits information from the at least one individual survey set up to the administrative processor or to another network connection located on at least one physical asset. In embodiments, the receiver transmitter can be a GPS differential receiver transmitter that identifies the location of the at least one physical asset on the planet with WGS-84 coordinates, which can be transformed to a local coordinate system with longitude and latitude coordinates or x-y coordinates. In embodiments, the global positioning system differential receiver/transmitter can be used to identify the location of at least one tagged asset on the planet and be used to identify at least one independent survey set up on the at least one physical asset on the planet.

The term "hyperlink" as used herein can refer to data that the customer or user can directly follow either by clicking on or by hovering over using a mouse or other indicator, and which then is followed automatically to another document in another data storage or in an electronic library at another location. A hyperlink can point to a whole document or to a specific element within a document.

The term "independent survey set up" as used herein can refer to an assembly of connected equipment including a data capture device with a survey set up processor with bidirectional communication, connectable with a power supply, which may be rechargeable batteries or vessel power, data storage connected to the survey set up data storage, which provides temporary or portable memory storage of images from the data capture device as well as data including GPS coordinates, actual proximate equipment names, height from decks and ceiling, camera specifications including lenses, and age and model of cameras. At least one independent survey set in embodiments may communicate with another independent survey set up as well as a network to communicate with the administrative processor of the system. The at least one independent survey set might include information on mounting means, such as tripods, clamps, watertight underwater housings. In some embodiments, the at least one independent survey set up may include additional lighting systems connected to the survey set up processor or the data capture device or both. The survey set up processor could store in the survey set up data storage information on the lighting such as lumens, watts, and type of light, such as "flash halogen", strobe or steady light emitting diodes (LED). In some embodiments, the independent survey setups are mounted outside on a semi-submersible or jack up platform, the survey set up data storage can include information on protective housings, and dates of repair or inspection of the housing or entire independent survey set ups as well as maintenance information on the at least one independent survey setup. The independent survey set up processor can be a computer or device similar to the administrative processor. The independent survey setup data storage and all data storages in this application are non-transitory computer readable mediums.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "laser analysis software" as used herein can refer to commercially available software that allows a customer using the executive dashboard to perform real time measurements of at least one tagged asset with the data capture device from the executive dashboard. Commercially available laser analysis software can be purchased from Leica Geosystems of the United Kingdom.

The term "library of tagged assets" as used herein can refer to a customer defined tagged assets on the specific at least one physical asset. Each customer profile can have a library of tagged assets. The at least one tagged asset can be valves, meters, pumps, gauges, switches, and/or pipes or any other tagged asset on the at least one physical asset. In the library of tagged assets, at least one tagged asset can have a specification, which can include a manufacturing date of the at least one tagged asset, a maintenance schedule or schedule of repairs or inspections, and known defects. At least one tagged asset can have additional information related to start date and end dates of maintenances for tracking service to the tagged asset. In the library of tagged assets, at least one tagged asset can have an installation date. At least one tagged asset can have a priority code, showing the importance of the at least one tagged asset on the at least one physical asset. Some tagged assets are critical to operation of a drilling rig and have a high priority; other tagged assets, such as running the toilets of the crew accommodation, can have a lower priority. The library of tagged assets can be customized to particular user needs, and can include information such as manufacturing materials of tagged asset, color of the tagged asset, size, weight, and anticipated length of usable operation.

The term "library of images" as used herein can refer to images, drawings, figures, manufacturing information including dates of install, dates of manufacture, maintenance records, and other text, which can include specifications on the at least one tagged asset, which can be used on the at least one physical asset. The library of images can be digital, analog, or video images. Sonar read outs can also be in the library of images for underwater assets in particular. CAD drawings can be in the library of images. 3D simulations can be in the library of images as well as animations.

The term "library of survey set ups" as used herein can include information that comes directly from or relates to at least one independent survey setup: (i) equipment specifications on data capture devices used in at least one independent survey set up, such as a laser scanner make and model, a camera make, and model and camera specifications; (ii) an address of at least one independent survey set up in the layered coordinate system view with icons; (iii) a live video feed, a stored video feed, or still photos of the at least one tagged assets, and can include sonar; (iv) laser data and related information on lasers used in at least one survey set up; (v) semi-temporary targets identified for establishing the location of the at least one tagged asset in the physical asset local zone system; (vi) at least two and possibly three x, y and z coordinates locating the at least one independent survey set up in the at least one physical asset local zone system; (vii) support device information on equipment used to support the data capture device, such as a camera, a laser or both at a preferred height, an elevation above a mean water level, such as a tripod; (viii) a distance from the at least one physical asset; (ix) sources of power supply for at least one independent survey set up on the at least one physical asset, such as oil rig or vessel supplied power, batteries or a fuel cell; (x) an indication of how the digital transfer of data occurs from at least one independent survey set up to the administrative data storage; (xi) survey setup identifiers; (xii) data capture device codes; (xiii) transmission connection descriptions; (xiii) information on a time line of the data capture device; (xiv) a job project name; (xv) a customer name or customer code; and (xvi) a physical asset name or code. The library of survey set ups includes specifically independent survey set up identifiers; data capture device identifier codes; transmission connection descriptions that indicate how the data capture device can transmit data to the network; a time line of the data capture device; a customer name; and a physical asset name.

The term "local grid" as used herein can refer to a customer defined location system developed for at least one specific physical asset. The local grid identifies using a geolocation system for the at least one tagged asset specifically by at least one of: a height, an angle, or a distance to certain markers, monuments or identified positions indicated by the customer on at least one physical asset. In embodiments, the system can tie the at least one independent survey set ups to the local grid system and then connect the grid to the network enabling at least one independent survey set up to be trackable along with the at least one tagged asset using a customer's local grid of the at least one physical asset.

The term "memory tag" can refers to a tag that can be actually or virtually affixed to either at least one survey set ups or at least one tagged assets or both, which contains specification information on at least one tagged asset or at least one independent survey set up equipment or both, such as age, date of equipment install, owner name, repairs performed, type of data being measured, communication protocols and the like.

The term "network" as used herein can refer to a cellular network, the internet, another global communication system, a local area network, a wide area network, a satellite network, any known network known in the industry or combinations thereof. The network can be a client's own private network or a third party network, such as a cloud network.

As the term is used herein, "physical assets" as used herein can refer to a fixed or floating vessel, or an underwater structure. The at least one physical assets can be a drilling rig, a semisubmersible a tension leg platform, a floating production and storage vessel, a floating storage unit, a platform, or underwater equipment connected to at least one physical asset, such as an ROV viewing an open hole section of a subsea well or a manifold, or a plan pipeline.

The term "physical asset local zone system" as used herein can refer to a local zone system created for identified assets on at least one physical asset using a customer provided origin, which has a linear dimension. The local zone system can be a survey of the entire structure or a portion of the structure.

The term "physical property sensor" as used herein can refer to devices or sensors that measure physical properties. Physical property sensors can refer to at least one of: a sonar device, a temperature sensor, a pressure sensor, an accelerometer, a strain gauge, a salinity detector, a corrosion monitor, a motion detector for at least one of pitch, yaw, roll and heave, a curvature sensor, a magnetic field sensor, an ultrasonic flow sensor, a fluid or material thickness sensor, a humidity sensor, an infrared frequency detector, and an electrical current sensor.

The term "point cloud registration viewer" as used herein can refer to a software tool that provides a set of tools for aligning point clouds captured from different scanning positions, quickly and accurately, enabling professionals to process point clouds for robust export into CAD (and other applications), and to allow robust import of data from CAD (and other applications).

The term "real time" as used herein can refer to the most recent captured data from a data set or from a at least one independent survey set up. The invention allows multiple customers to view in real time simultaneously captured data from multiple data capture devices on the at least one physical asset. Real time can refer to an ability to display the captured data 24 hours a day, 7 days a week, continuously.

The term "tagged asset" as used herein can refer to an underwater asset, such as a wellhead, a manifold, a pipeline, and ends of pipelines. An underwater tagged asset can be a jacket and a pipeline riser or similar underwater assets. The term "tagged asset" also can refer to above water assets, including but not limited to meters, pumps, gauges, switches, and mechanical devices including pipes, and other structural elements on at least one physical asset. At least one tagged asset can be a moored platform, a moored boat, and/or a moored barge, a rail car, a chemical facility, or communication facility with satellite dishes.

The term "virtual tag" as used herein can refer to a non-physical tag displayed on the 360 degree panoramic in a specific coordinate position. The virtual tag can have a unique reference number, which can be stored in the database along with additional information including coordinate position, description, ID, hyperlink, photograph link or video link.

The embodiments relate to a system for measuring the at least one tagged asset on the at least one physical asset, such as a floating vessel or a chemical plant.

The system can use an administrative processor, administrative data storage and network to connect to the at least one client device to receive information on the at least one tagged asset and identify them in a customer's local zone system of at least one physical assets.

The system then uses computer instructions to determine how many independent survey set ups are needed to view at least one tagged asset.

An image of at least one tagged asset can be used and icons for the at least one tagged asset is overlaid on the image.

A map of the at least one tagged asset on a geographic zone of the physical asset can be created and icons of at least one survey set up and at least one tagged asset are then inserted on the map creating a layered coordinate system view with icons of at least one independent survey set up and at least one tagged asset for a section of or for an entire physical asset.

The at least one independent survey set up can communicate with a network to the administrative processor and to third party client devices enabling individual customers to view at least one tagged asset of at least one physical asset all simultaneously.

The system can have computer instructions in the administrative data storage to instruct the administrative processor to create a library of tagged assets for a customer for at least one physical asset.

The system can have computer instructions that enable the administrative processor to connect to and retrieve images from a library of images which may be in a third party data storage connected to a third party processor communicating with the network.

The system can have computer instructions in the administrative data storage to instruct the administrative processor to create a library of survey set ups for at least one independent survey set up on at least one physical asset of the customer.

The system can have computer instructions in the administrative data storage to instruct the administrative processor to create an executive dashboard on a client device, miles from the at least one physical asset that displays data capture information on at least one tagged asset of at least one physical asset, allow a customer to create and view customized reports on at least one tagged asset of that at least one physical asset, and to perform actual measurements of at least one tagged asset in real time from at least one client device of the customer.

The system can have computer instructions in the administrative data storage to instruct the administrative processor to verify that at least one independent survey set up is in an optimal location for monitoring at least one tagged asset.

The system can have computer instructions in the administrative data storage to instruct the administrative processor to collect and transfer data from the at least one independent survey set up and form a viewable image of at least one tagged asset, which can be seen on an executive dashboard.

In embodiments, the system can have computer instructions in the administrative data storage to instruct the administrative processor to instruct the administrative processor to export all or a portion of the layered coordinate system view with icons to at least one client device via the network.

In embodiments, the system can have computer instructions in the administrative data storage to instruct the administrative processor to capture and calibrate the separate camera images within the layered coordinate system view with icons enabling a user to take measurements of the at least one tagged asset using at least one client device remote to at least one physical asset.

In embodiments, the system can have computer instructions in the administrative data storage to instruct the administrative processor to enable a user with at least one client device to draw a polygon on a portion of the a layered coordinate system view with icons and zoom in on all or a portion of at least one tagged asset contained in the polygon, the polygon linking to data in the library of tagged assets for at least one specific tagged asset.

In embodiments, the system can have computer instructions in the administrative data storage to instruct the administrative processor to provide individual user profiles within the customer profile. The individual user profiles can have at least one of: a user name, an access restriction, and contact information such as a phone, email.

In embodiments, the system can have computer instructions in the administrative data storage to instruct the administrative processor to provide bidirectional communication between individual user profiles within the customer profile.

In embodiments, the system can have computer instructions in the administrative data storage to instruct the administrative processor to import at least one GIS mapping indicator from a third party processor connected to the network linking the GIS mapping indicators into the layered coordinate system view with icons to display at least one of: a precise a geographic indicator or a precise geographic anomaly proximate to the tagged asset.

In embodiments, the system can have computer instructions in the administrative data storage to instruct the administrative processor to connect to a customer processor with customer data storage containing existing survey set up information and import the existing survey set up information for at least one tagged asset into the layered coordinate system view with icon.

In embodiments, the system can have computer instructions in the administrative data storage to instruct the administrative processor to provide an encrypted communication from the administrative processor to at least one independent survey set up and from at least one independent survey set up to the administrative processor.

In embodiments, the system can have computer instructions in the administrative data storage to instruct the administrative processor to create at least one memory tag for a at least one tagged asset or for at least one independent survey setup. The memory tag can contain user defined data on at least one tagged asset. User defined data can include dimensions, age, color, type, repair information. The memory tag can be an RFID tag or a virtual memory tag.

In embodiments, the system can have computer instructions in the administrative data storage to instruct the administrative processor to generate user customizable reports configured to interface with a user having at least one client device to select and generate a report with user identified charts such as pie charts, user identified graphs, such a linear graphs, for measured data from the at least one tagged asset on at least one physical asset.

In embodiments, at least one independent survey set up can include a support member, such as a tripod for supporting any data capture devices, survey set up processor, and survey set up data storage, enabling static data collection on the at least one physical asset for at least one tagged asset.

Turning now to the Figures, FIG. 1 shows the system for monitoring and measuring at least one tagged asset 9a, 9b, 9c on at least one physical asset 10a, 10b respectively all simultaneously.

The at least one tagged asset can be on at least one physical asset 10a and 10b.

In embodiments, the at least one physical asset can be onshore or offshore telecommunication assets, a petrochemical plant, or an onshore oil well.

The at least one tagged asset can be pumps, meters gauges, or other assets on at least one physical asset, which are generally fixed to at least one physical asset.

The at least one physical asset 10a is depicted as a drilling platform and the at least one physical asset 10b is shown as a floating vessel as examples.

At least one of independent survey set up 17a and 17b is shown. The at least one independent survey set up can have one or more data capture devices 18a and 18b. The at least one independent survey set up with one or more data capture devices can be mounted to the at least one physical asset and connected to the network providing measurement and monitoring from static support members or mounted to movable devices, such as ROVs, AUVs, and other moving vehicles providing dynamic data capture monitoring and measurement.

The one or more data capture devices can connect directly or be in communication to a network 606 on the at least one physical asset, such as a local area network on a drilling rig, which in turn connects to a satellite network.

Global positioning system differential receiver/transmitters 20a and 20b can be disposed on the at least one physical asset and can communicate to the administrative processor 12 through the network 606, enabling the system to correctly locate at least one physical asset.

A remotely controlled vehicle 11a with at least one independent survey set up is shown monitoring and measuring at least one tagged asset 9c, which is shown as a subsea well.

An unmanned aerial vehicle 11b with at least one independent survey set up is shown monitoring and measuring at least one tagged asset 9a.

An autonomous surface vehicle 11c with at least one independent survey set up is shown monitoring and measuring at least one tagged asset 9a.

An autonomous underwater vehicle 11d with at least one independent survey set up is shown monitoring and measuring at least one tagged asset 9a.

At least one independent survey set up 17a and 17b can be mounted on each remotely controlled vehicle 11a, 11b, 11c, 11d to provide dynamic monitoring and measuring. In an embodiment, the system can be used to monitor at least one of tagged asset 9a, 9b, 9c on one level of a drilling semisubmersible.

The system can include the administrative processor 12 with an administrative data storage 14. In embodiments, the administrative processor can be a computer located remote from the at least one physical asset. In embodiments, the administrative data storage can be one or more hard drives, supplemented portable data storage, or a jump drive.

The administrative processor 12 can be connected to the network 606, which can connect to the at least one physical asset.

In embodiments, the network can be a satellite network, a cellular networking a global communication network, a local area network, a wide area network, any known network in the industry, and combinations thereof. In embodiments, two or more networks can be used together and connected to the administrative processor.

At least one client device 27*a* and 27*b* can be connected to or in communication with the network 606.

In embodiments, the at least one client device 27*a* and 27*b* can have a client device processor 28*a*, 28*b*, a client device data storage 29*a*, 29*b* and a display 19*a* and 19*b*, which can show a layered coordinate system view with icons 900*a* and 900*b*.

A third party processor 6 can be connected to or in communication with the network 606. Each third party processor 6 can communicate with a third party data storage 7, which can contain a library of images 30*b*, which can be accessed by the administrative processor 12 for use in the system.

The third party data storage 7 can contain at least one GIS mapping indicator 37. The at least one GIS mapping indicator can be added into the layered coordinate system view with icons to display at least one of: a precise a geographic indicator or a precise geographic anomaly proximate to the tagged asset.

A customer processor 55 can be connected to both the network 606 and a customer data storage 57. The customer data storage 57 can contain existing survey set up information 59. The existing survey set up information can be imported into the layered coordinate system view with icons 900*a* and 900*b*.

Virtual reality goggles 13, which can be worn by an individual user of a customer can also be connected to the network 606. The virtual reality goggles can enable the individual user to receive and view the layered coordinate system view with icons enabling the user to walk around at least one tagged asset and to move from one icon to another icon in the layered coordinate system view with icons.

FIGS. 2A-2D depict the administrative data storage according to one or more embodiments.

The administrative data storage 14 can include a customer profile 22.

In embodiments, the administrative data storage, the third party data storage, or both can include a library of images 30*a* containing a plurality of files 31. Each file can contain information on the at least one tagged asset in general, such as manufacturer information and origin of manufacture and can contain an image 32 of at least one tagged asset.

The system can include a plurality of computer instructions stored in the administrative data storage to instruct the administrative processor to perform the various tasks.

The administrative data storage 14 can include computer instructions 200 to create the customer profile and store the customer profile in the administrative data storage.

The administrative data storage 14 can include computer instructions 202 to create a physical asset local zone system using the customer provided origin and store the physical asset local zone system connected to the customer profile in the administrative data storage enabling a customer to view a graphic image, the tagged assets and the independent survey set ups positioned on the physical asset in the physical asset local zone system.

In embodiments, the same computer instructions can access and store information on an already created local grid on at least one physical asset for use with the system.

The administrative data storage 14 can include computer instructions 206 to identify placement locations of independent survey set ups in a created physical asset local zone system of the physical asset or a local grid of the physical asset enabling each independent survey set up to monitor tagged assets identified from the library of tagged assets.

The administrative data storage 14 can include computer instructions 214 to present multiple independent survey set ups simultaneously on the executive dashboard and display the multiple tagged assets of the physical asset on the executive dashboard simultaneously.

The administrative data storage 14 can include computer instructions 216 to zoom in and zoom out on an image from independent survey set ups on the executive dashboard when a zoom in button or a zoom out button is actuated.

The administrative data storage 14 can include computer instructions 217 to move through the image from the independent survey set ups on the executive dashboard in 360 degrees around an axis of the local coordinate network of assets or the local grid when a rotate button is actuated.

The administrative data storage 14 can include computer instructions 218 to move through the image from an independent survey set up on the executive dashboard in 360 degrees in a horizontal plane of the local coordinate network of assets or the local grid using a left pan button and a right pan button.

The administrative data storage 14 can include computer instructions 219 to move through the image from an independent survey set up on the executive dashboard in 360 degrees in a vertical plane of the local coordinate network of assets or the local grid using an up button and a down button.

The administrative data storage 14 can include computer instructions 220 for installing show hide icons onto an image from an one independent survey set up on the executive dashboard when a show hide button is actuated.

The administrative data storage 14 can include computer instructions 222 to add and delete a tagged asset to/from the library of tagged assets using a client device using a dialog screen to insert or delete: an asset name, an asset geolocation, and asset specifications, when an add or delete button is actuated.

The administrative data storage 14 can include computer instructions 224 to search for a tagged asset from the library of tagged assets using an asset name or an asset geolocation and present the results of the search on the executive dashboard.

The administrative data storage 14 can include computer instructions 226 to add a compass to images from the library of tagged assets for display on the executive dashboard while depicting, the local coordinate network of assets or the local grid, wherein the compass is aligned to a true north relative to the one tagged asset on the planet.

The administrative data storage 14 can include computer instructions 228 to present a laser analysis button on the executive dashboard connected to laser analysis software in the administrative data storage.

In an embodiment, the laser analysis button can have an image of a triangle on the button.

The administrative data storage can include laser analysis software 230.

The administrative data storage 14 can include computer instructions 232 to enable a user on a client device to toggle between a full screen and a reduced screen view of a tagged asset, when a full screen/reduced screen toggle button is actuated on the executive dashboard.

The administrative data storage 14 can include computer instructions 236 to enable a user to toggle between a full color image and a monochrome image from an independent survey set up when a color/monochrome toggle button is actuated.

The administrative data storage 14 can include computer instructions 240 that supply location information from a local coordinate network of assets or a local grid of tagged assets and identify at least one geographically proximate independent survey set up location in the local coordinate network of assets or the local grid when an information button is actuated on the executive dashboard.

The administrative data storage 14 can include computer instructions 244 to display a map of the local coordinate network of assets or the local grid while simultaneously viewing images from the independent survey set up when a tab on the executive dashboard is activated.

The administrative data storage 14 can include computer instructions 245 to create a plan view of all or a portion of the independent survey set up from the library of survey set ups on the executive dashboard.

The administrative data storage can include computer instructions 246 for indicating a direction of a field of reference relative to a north of the physical asset on the plan view in the physical asset local zone system or local grid from an independent survey set up using a field of view reference pointer in the plan view created when a tab is actuated on the executive dashboard.

The administrative data storage 14 can include computer instructions 250 to present the plan view simultaneously with the image from one or more operating independent survey set ups using the executive dashboard.

The administrative data storage 14 can include computer instructions 252 creating a library of survey set ups capturing information from each independent survey set up mounted on or proximate to a physical asset.

The administrative data storage 14 can include computer instructions 254 to form an executive dashboard for displaying the images and data from the independent survey set up and from the libraries and transmitting the executive dashboard to a client device of a customer.

The administrative data storage 14 can contain a library of survey set ups 400.

The administrative data storage 14 can include computer instructions 502 to instruct the administrative processor to: integrate the named tagged asset with a tagged asset location and the customer designated coordinate system of the named physical asset into a point cloud registration viewer and generate a plan for monitoring and measuring the tagged asset using the point cloud registration viewer and at least one independent survey set up while simultaneously generating a layered coordinate system view with icons that includes the named tagged asset, the layered coordinate system view with icons formed by layering a location of each independent survey set up on top of a customer designated coordinate system for the named physical asset with the tagged asset, wherein each independent survey set up is linked to a library of survey set ups.

The administrative data storage 14 can include the point cloud registration viewer 504, and the plan 506, which can be generated by computer instructions 502.

The administrative data storage 14 can include computer instructions 508 to instruct the administrative processor to link icons of tagged assets to at least one independent survey set up, wherein at least one independent survey set up monitors and measures at least one tagged asset.

The administrative data storage 14 can include computer instructions 509 to instruct the administrative processor to link icons of tagged assets to a 360 degree panoramic view enabling a user to view at least one of: a 2D visual representation and a 3D visual representation of the tagged asset.

The administrative data storage 14 can have computer instructions 510 to instruct the administrative processor to connect each icon of tagged assets to a library of tagged assets stored in the customer profile, the library of tagged assets comprising a plurality of asset names and specification information on each tagged asset, wherein the icons of the tagged assets can have at least one of: a hyperlink, a video link, and a pictorial link, to engage another data source connected to the network.

The administrative data storage 14 can include computer instructions 522 to instruct the administrative processor to export all or a portion of the layered coordinate system view with icons to a client device via the network.

The administrative data storage 14 can include computer instructions 524 to instruct the administrative processor to capture and calibrate the separate camera images within the layered coordinate system view with icons enabling a user to take measurements of the tagged asset using at least one client device remote to at least one physical asset.

The administrative data storage can contain any drawn polygon 525, which can be inserted into the layered coordinate system view with icons.

The administrative data storage 14 can include computer instructions 526 to instruct the administrative processor to enable a user with a client device to draw a polygon on a portion of the a layered coordinate system view with icons and then zoom in on all or a portion of the tagged assets contained in the polygon, wherein the polygon can be linked to data in the library of tagged assets for specific tagged assets.

The drawn polygon 525 can be stored in the administrative data storage and connected to a polygon button 527, which can enable the computer instructions to draw the polygon on the view of at least one tagged asset.

The administrative data storage 14 can include computer instructions 530 to instruct the administrative processor to provide individual user profiles in the customer profile.

The administrative data storage 14 can include computer instructions 540 to instruct the administrative processor to provide bidirectional communication between individual user profiles within the customer profile.

The administrative data storage 14 can include computer instructions 542 to instruct the administrative processor to import at least one GIS mapping indicator from a third party processor with a third party data storage and connected to the network linking the at least one GIS mapping indicator into the layered coordinate system view with icons to display at least one of: a precise a geographic indicator or a precise geographic anomaly proximate to the tagged asset.

The administrative data storage 14 can include computer instructions 544 in the administrative data storage to instruct the administrative processor to connect to a customer processor with customer data storage containing existing survey set up information and import the existing survey set up information for at least one tagged asset into the layered coordinate system view with icons.

The administrative data storage 14 can include computer instructions 546 to instruct the administrative processor to provide an encrypted communication from the administrative processor to independent survey set ups to the administrative processor.

The administrative data storage 14 can include computer instructions 548 to instruct the administrative processor to create at least one memory tag for a tagged asset or for an individual independent survey set up, the at least one memory tag can have user defined data on the tagged asset.

The administrative data storage 14 can include computer instructions 550 to instruct the administrative processor to generate user customizable reports, configured to interface with a user having a client device to select and generate a report with user identified charts, user identified graphs, for measured data from the tagged asset or a plurality of tagged assets on a physical asset.

FIGS. 3A-3B depict the customer profile in the administrative data storage according to one or more embodiments.

The customer profile 22 can include a customer name 302, a customer billing address 304, a survey date 306, a customer user identification 308, a customer password 310, a customer security question and an answer 312, a named physical asset 314, a tagged asset location 315, global positioning system coordinates for the named or coded physical asset 316, a customer provided origin 318, a quantity of independent survey set ups on the physical asset 319, and an physical asset local zone system 320.

The customer profile 22 can contain a library of tagged assets 322. The library of tagged assets 322 can have a plurality of tagged assets 324. At least one tagged asset in the library of tagged assets can have an icon 323. Each icon 323 can have a hyperlink 33, a video link 34, and a pictorial link 35. For example, a hyperlink can be www.use.utec.com/libraryofsurveysetups/shell/bullwinkle.

In embodiments, each tagged asset hyperlink, video link or pictorial link can connect the icon to engage another data source in the administrative processor or engage another data source in a third party processor with third party data storage connected to the network or to another data source via the network.

In embodiments, the customer profile 22 can contain asset addresses for each asset named using the global positioning system 326. In embodiments, the customer profile can contain an asset address for each tagged asset as positioned in the physical asset local zone system or the local grid 328.

The customer profile 22 can contain an asset elevation above a mean sea level 330, an asset location below a mean sea level 332, and an asset description 333.

The customer profile 22 can include the customer designated coordinate system 334, the local grid 335, and a named tagged asset 350

In embodiments, the customer profile 22 can contain a tagged asset location 352 in the customer designated coordinate system 334 of the named physical asset 314, specification information 399 on the tagged asset, and the drawn polygon 525 as positioned on a portion of the layered coordinate system view with icons 900.

The customer profile 22 can also contain individual user profiles 532. The individual user profiles can have at least one of: a user name 534, an access restriction 536, and contact information 538.

In embodiments, the customer profile can include pluralities of libraries of tagged assets if the customer has more than one physical asset, that is, one library for at least one physical asset.

FIG. 4 depicts a library of survey set ups according to one or more embodiments.

The library of survey set ups 400 can contain independent survey set up identifiers 402, independent survey set up data capture device codes 404, transmission connection descriptions 406, information on a time line of the data capture device 408, a customer name 302, and a physical asset name or code 314.

The library of survey set ups 400 can contain an address of the independent survey set up in the physical asset local zone system or the local grid 420 and at least one of: a live video feed, a stored video feed, still photos of the tagged asset, and sonar the tagged asset 422.

The library of survey set ups 400 can include laser information on lasers used in independent survey set ups 424, at least two and possibly three x, y, and z coordinates locating the independent survey set up in the physical asset local zone system or the local grid 426, and sources of power supply for each independent survey set up on the physical asset 428.

Transmission connections can contain an indication of how the digital transfer of data occurs from at least one independent survey set up to the administrative data storage.

The library of survey set ups 400 can include a job project name 430, equipment specifications on data capture devices used in independent survey set ups 432, such as a camera make and model and camera specifications, semi-temporary targets identified for establishing the location of the tagged asset in the physical asset local zone system or the local grid 434, support device information on equipment used to support the data capture device 436, such as a tripod, and a distance the independent survey set up is from the physical asset 438.

As examples, the independent survey set up identifiers 402 can be "C1-45" for a set up on a specific corner of level 3 of a drilling rig, independent data capture device codes 404 can be a laser scanner coded as "Leica 6200," and transmission connection descriptions 406 can indicate how the data capture devices can transmit data to the network, such as a transmission connection description can be a "jump drive."

In embodiments, the time line of the data capture device can be a date stamp indicating a month, day, year, and minutes when data capture starts and ends by the data capture device.

Figure 5:
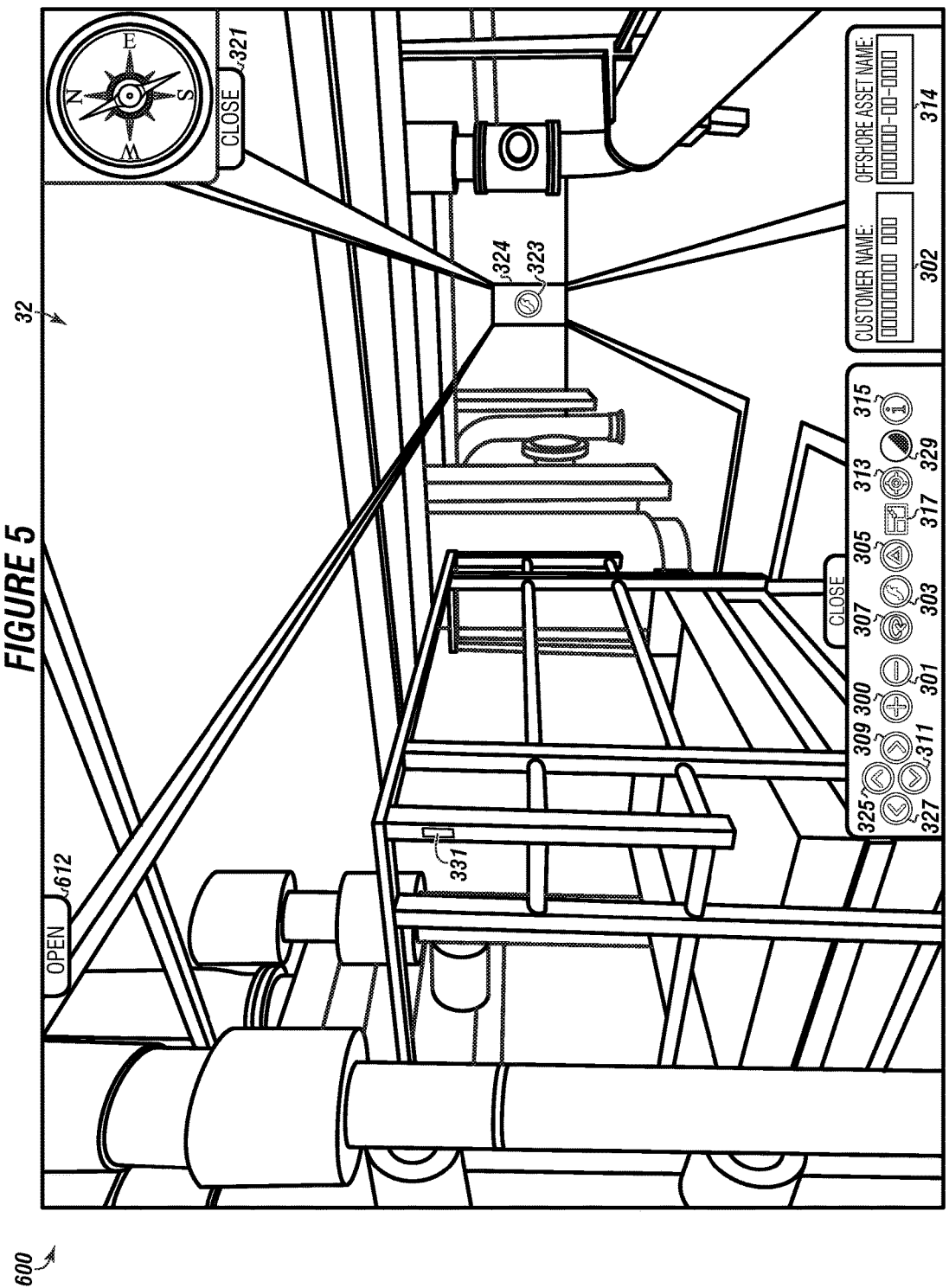
FIG. 5 depicts a display of an executive dashboard presented by the system according to one or more embodiments.

FIG. 5 depicts a display of an executive dashboard presented by the system according to one or more embodiments.

In executive dashboard can be formed by computer instructions in the administrative data storage, which can show a view from at least one independent survey set up to a display.

The executive dashboard 600 can display data from at least one independent survey set up and the library of survey set ups. The executive dashboard can also display information from the library of images.

The executive dashboard 600 can show a customer name 302 and a physical asset name or code 314.

In embodiments, the executive dashboard 600 can be displayed on the at least one client device of the customer.

The executive dashboard 600 can display an image 32 of at least one of the plurality of tagged assets 324 and an icon 323 virtually positioned on at least one tagged asset. The icon 323 can present a hyperlink to the library of survey set ups for at least one tagged asset enabling a customer using the executive dashboard 600 to toggle from the image 32 to the library of survey set ups for the at least one tagged asset being monitored by the at least one independent survey set up.

In embodiments, the executive dashboard 600 can have navigation buttons for use on displayed images from the library of tagged assets, a displayed local coordinate network of assets, or combinations thereof. The executive dashboard can present navigation buttons for displaying images from the library of tagged assets, the local coordinate network of assets, or combinations thereof on at least one client device connected to the network.

In embodiments, the executive dashboard, can allow a customer to move within the presented image of the at least one tagged asset. The executive dashboard 600 can include a zoom in button 300 and a zoom out button 301, a rotate button 307, and show hide button 303.

A laser analysis button 305 showing a triangle can be presented on the executive dashboard to connect to laser analysis software in the administrative data storage.

The executive dashboard can include a full screen/reduced screen toggle button 317, a left pan button 327 and a right pan button 309. The executive dashboard can include an up button 325 and a down button 311. The executive dashboard can include an add and delete button 313 to add or delete at least one tagged asset to/from the library of tagged assets using at least one client device.

In embodiments, the executive dashboard can include an information button 315 that can supply current location information from a local coordinate network of assets or local grid and can identify at least one geographically proximate independent survey set up location in the local coordinate network of assets.

The executive dashboard can include a color/monochrome toggle button 329 that can allow a user to toggle between a full color image from the local coordinate network of assets, and a monochrome image from the local coordinate network of assets.

In embodiments, a compass 321 can be displayed that depicts the orientation of the image from the data capture device to a north relative to the physical asset local zone system.

A tab 612 on the executive dashboard can activate computer instructions to display a map.

A memory tag 331, which can be generated when an add or delete button is actuated, is also shown. The memory tag information can be saved to the library of tagged assets.

Figure 6:
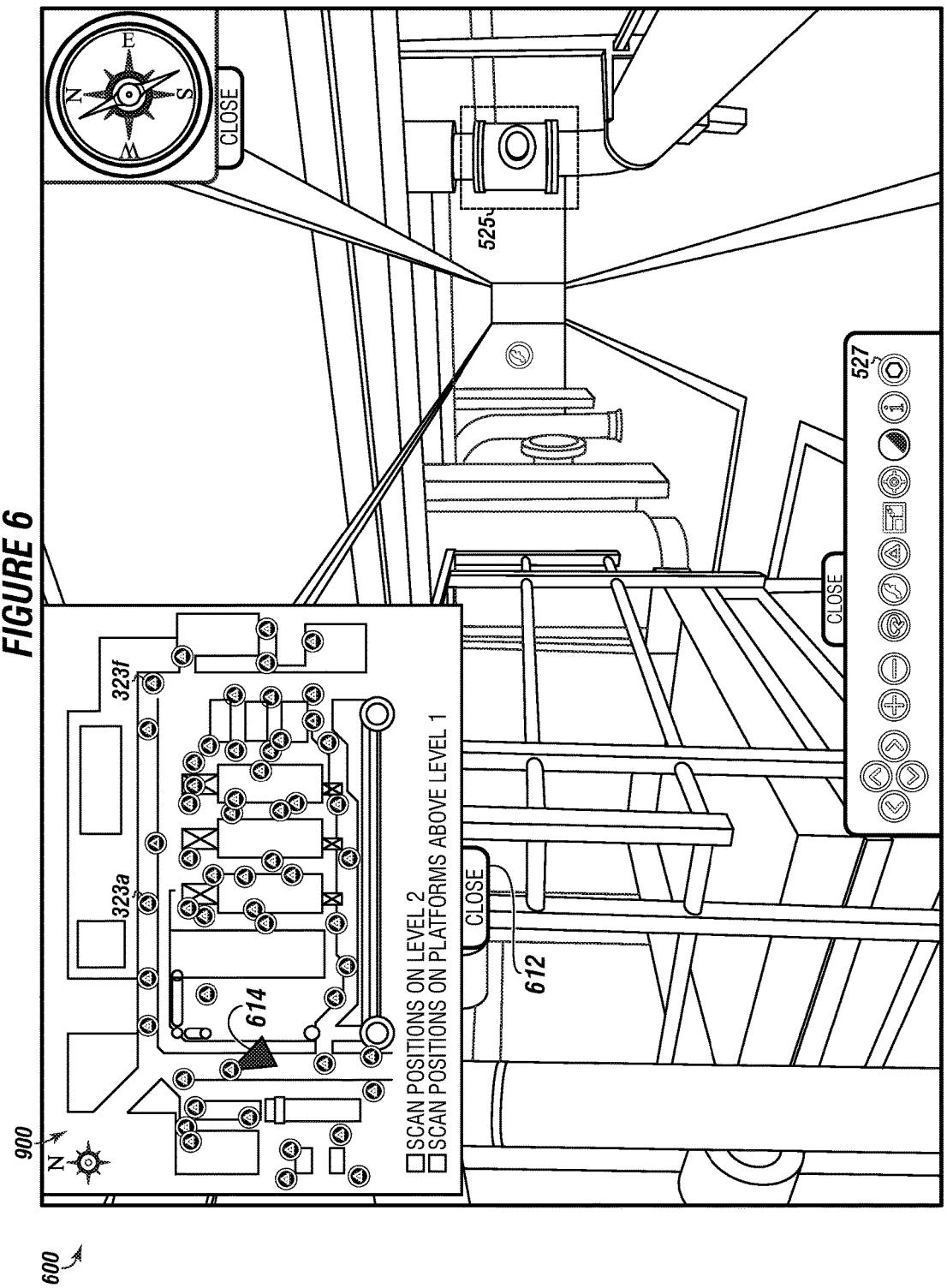
FIG. 6 depicts a plan view of the locations of at least one independent survey set up on at least one physical asset in a layered coordinate system view with icons according to one more embodiments.

FIG. 6 depicts a plan view of the locations of at least one independent survey set up on at least one physical asset in a layered coordinate system view with icons according to one more embodiments.

The layered coordinate system view with icons 900 displays placement locations of at least one tagged asset on at least one physical asset in the map and shows a specific tagged asset image, which can be displayed on the executive dashboard 600.

The layered coordinate system view with icons 900 can have both a plan view formed using computer instructions, for at least one independent survey set up data capture device and the actual image from the data capture device simultaneously.

The layered coordinate system view with icons 900 can display the icons 323a-323f of tagged assets in the plan view. Each icon 323a-323f can be shown as a triangle while data and or images from one specific capture device can be simultaneously presented.

In embodiments, computer instructions can be configured so that plan views drop down and are overlaid onto data capture images when the tab 612 is activated.

Computer instructions in the administrative data storage can instruct the administrative processor to create a pointer 614. The pointer 614 can indicate a direction of a field of reference relative to a north of at least one physical asset in the physical asset local zone system.

The drawn polygon 525, shown as a rectangle, which shows a dash lined rectangle over a piece of equipment. A user can zoom in on all or a portion of at least one tagged asset contained in the drawn polygon 525. The drawn polygon can be linked to data in the library of tagged assets for at least one specific tagged asset. The drawn polygon 525 can be stored in the administrative data storage.

The polygon button 527 can be a button that actuates computer instructions and can be stored in the administrative data storage.

Figure 7B:
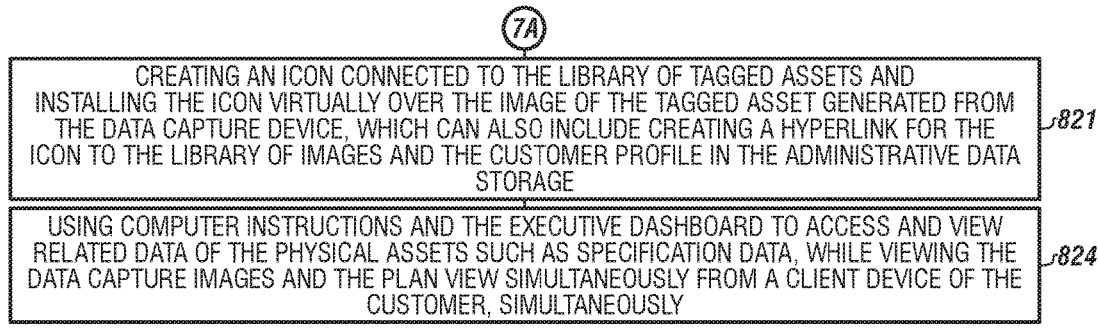

FIGS. 7A-7B depict a sequence of steps to implement the system according to one or more embodiments.

In embodiments, sequence of steps to implement the system can be performed by the customer using at least one client device connected to the network and the administrative processor with administrative data storage as described.

The sequence of steps can include creating a customer profile which is stored in the administrative data storage on in a cloud computing data storage, as shown in box 801.

In embodiments, the customer profile can be created using a client device by the customer, wherein the client device can be connected to the network.

The sequence of steps can include providing a physical asset name and physical asset address for at least one physical asset to be surveyed, as shown in box 803.

The sequence of steps can include identifying a customer provided origin on the physical asset for surveying, as shown in box 805.

The sequence of steps can include identifying areas of at least one physical asset for monitoring, such as surveying, as shown in box 807.

The sequence of steps can include using an executive dashboard, created using computer instructions in the administrative data storage, to request surveying and monitoring of identified portions of the physical asset with the physical asset address, as shown in box 809.

The sequence of steps can include requesting creation and installation of independent survey set ups on the physical asset, which target customer identified target assets, as shown in box 810.

The sequence of steps can include using computer instructions in the administrative data storage to instruct the administrative processor to create a physical asset local zone system for the identified areas of the physical asset local zone system or the local grid, as shown in box 811.

The sequence of steps can include using computer instructions in the administrative data storage to instruct the administrative processor to identify optimum locations to place independent survey set ups with data capture devices oriented at the customer identified tagged assets, as shown in box 812.

The sequence of steps can include using computer instructions in the administrative data storage to instruct the administrative processor to verify if independent survey set ups are at the optimum locations or if independent survey set ups must be moved to different locations in order to capture more customer identified tagged assets providing a maximum coverage for a customer identified area of a physical asset, as shown in box 813.

The sequence of steps can include "turning on", such as powering up, the independent survey set ups to perform data capture of the customer identified tagged assets, as shown in box 814.

The sequence of steps can include transferring data from operating independent survey set ups to the administrative data storage, as shown in box 815.

The sequence of steps can include generating a library of survey set ups using information on the independent survey set ups and using computer instructions in the administrative data storage and storing the library of survey set ups in the administrative data storage, as shown in box 816.

The sequence of steps can include using computer instructions in the administrative data storage to instruct the administrative processor to create a plan view of all or a portion of the independent survey set ups from the library of survey set ups, as shown in box 817.

The sequence of steps can include using computer instructions in the administrative data storage to instruct the administrative processor to enable a plan view to be viewed simultaneously with the data from one or more operating independent survey set ups using the executive dashboard, as shown in box 818.

The sequence of steps can include using computer instructions in the administrative data storage to instruct the administrative processor to form a library of tagged assets for the specific physical asset being surveyed with the independent survey set ups, as shown in box 820.

The sequence of steps can include creating an icon connected to the library of tagged assets and installing the icon virtually over the image of the tagged asset generated from the data capture device, which can also include creating a hyperlink for the icon to the library of images and the customer profile in the administrative data storage, as shown in box 821.

In embodiments, creation of the icon can include creating a hyperlink for the icon to the library of images and the customer profile in the administrative data storage. In embodiments, the library of images can be in the third party data storage.

By linking the library of tagged assets to the library of survey set ups, at least one tagged asset can be monitored simultaneously with a plan view map using locations indicated in the physical asset local zone system displayed on the executive dashboard.

The customer can now make decisions in real time on repair, maintenance, safety, and asset inventory control using at least one of the client device, which can be remote from at least one physical asset, or using at least one of the client devices that is on or adjacent to at least one physical asset.

The sequence of steps can include using computer instructions and the executive dashboard to access and view related data of the physical assets such as tagged asset specification data, while viewing the data capture images and the plan view simultaneously from a client device of the customer, as shown in box 824.

The sequence of steps can include using computer instructions for monitoring at least one of tagged asset. The at least one client device can tour at least one physical asset with real time visualisation, get accurate real world on screen measurements, using laser analysis software, and view/download all deliverables such as drawings, 3D models, photos and reports through a library of images. All information can be derived from the latest data capture devices, allowing real time monitoring from remote locations by one or more users, providing ultimate confidence. A library of tagged assets can be incorporated into the ISITE™ system created by UTEC Survey, Inc. of Houston, Tex., intelligently linking, via a world area network, private network, third party cloud network, or any various combinations thereof.

Visualisation tools designed to revolutionize and consolidate asset management operations, which are proven to increase productivity and reduce operational expenditures, while minimising accidents, environmental harm and injuries by visualising and identifying hazards in advance of work being carried out on at least one physical asset.

The information can be derived from the latest data capture devices, allowing real time monitoring from remote locations by one or more users, providing ultimate confidence using a customer client device.

Figure 8:
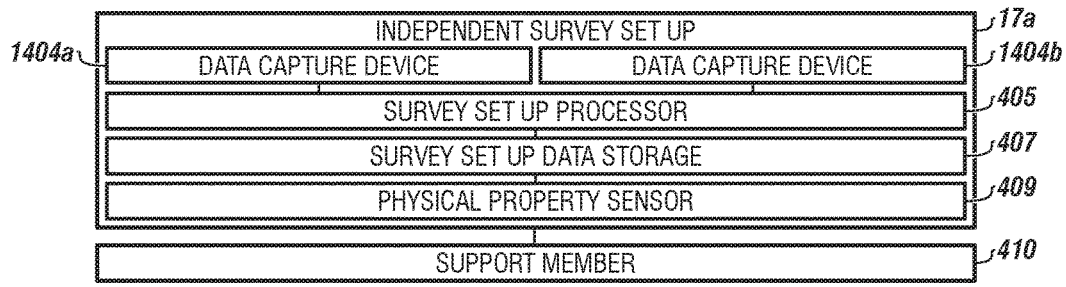
FIG. 8 depicts the at last one independent survey set up according to one or more embodiments.

FIG. 8 depicts the at last one independent survey set up according to one or more embodiments.

In embodiments, at least one independent survey set up 17a can be located proximate to at least one tagged asset.

The at least one independent survey set up 17a can have at least one data capture 1404a and 1404b. The one or more data capture devices can be a laser scanner, a camera, such as an infrared camera, a video camera, a high dynamic range camera and a still camera, or similar device known in the industry for data capture.

In embodiments, a survey set up processor 405 can be in a wired or wireless connection to the data capture devices 1404a and 1404b. A survey set up data storage 407 is shown connected to the survey set up processor 405.

The at least one independent survey set up 17a can have a physical property sensor 409, which can be a temperature sensor.

The at least one independent survey set up 17a can have a support member 410, which can be used to support the at least one data capture device, the survey set up processor, and the survey set up data storage, enabling static data collection on at least one physical asset for at least one tagged asset.

Figure 9:
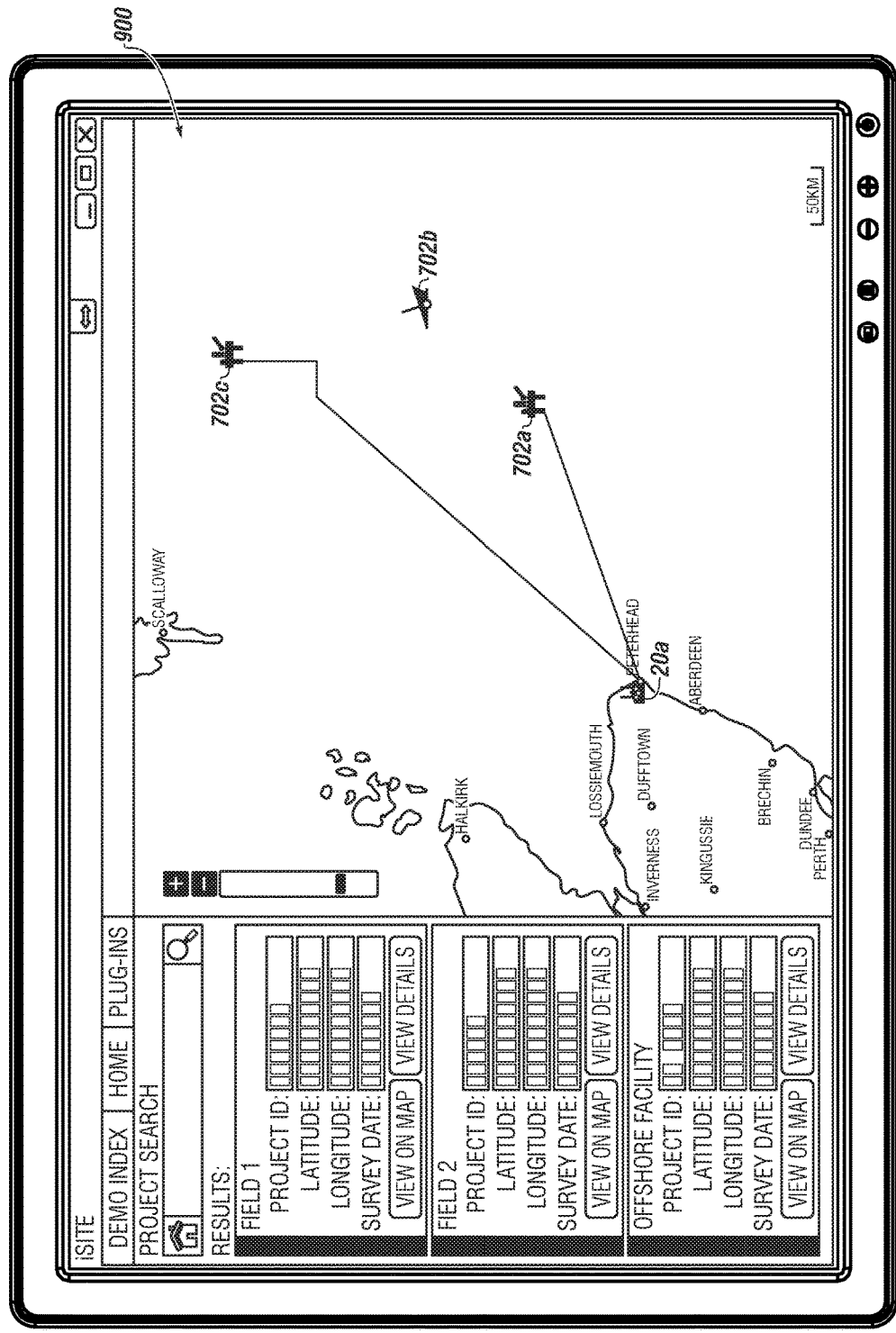
FIG. 9 depicts the layered coordinate system view with icons created by the system according to one or more embodiments.

FIG. 9 depicts the layered coordinate system view with icons created by the system according to one or more embodiments.

The layered coordinate system view with icons 900 created by the system to import at least one GIS mapping indicator into the layered coordinate system view with icons 900 to display a precise geographic indicator 702a, 702c or a precise geographic anomaly 702b, shown here as a wreck, proximate to the at least one physical asset with at least one tagged asset.

Figure 10:
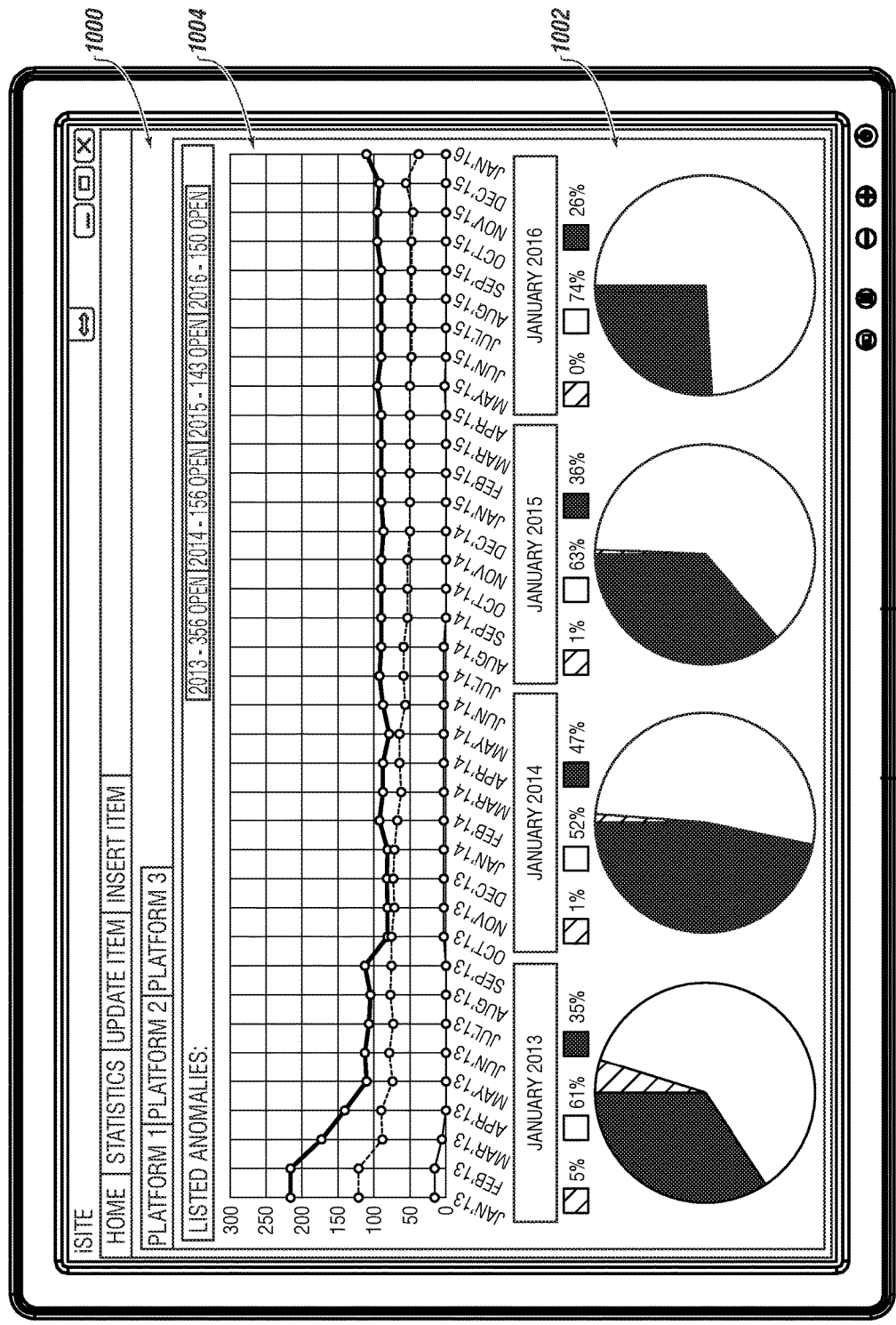
FIG. 10 depicts an exemplary report produced by the system according to one or more embodiments.

FIG. 10 depicts an exemplary report produced by the system according to one or more embodiments.

A report 1000 can be produced using the system for at least one physical asset having at least one tagged asset. The report 1000 is shown with user identified charts, user identified graphs 1002, such as pie charts, and linear graphs 1004, for measured data from the at least one tagged asset on a physical asset of at least one physical asset.

FIG. 11 depicts an exemplary memory tag according to one or more embodiments.

This embodiment depicts the contents in the memory tag 331 created by the administrative data storage as an example. The memory tag shows at least one tagged asset for at least one independent survey setup, which has user defined data on the at least one tagged asset. The memory tag information can be saved to the library of tagged assets. In embodiments, the memory tag can be an RFID tag or a virtual memory tag.

While these embodiments have been described with emphasis on the embodiments, it should be understood that within the scope of the appended claims, the embodiments might be practiced other than as specifically described herein.

What is claimed is:

1. A system for monitoring at least one tagged asset on at least one physical asset, the system comprising:
   a. an administrative processor and an administrative data storage connected to a network;
   b. at least one independent survey set up, the at least one independent survey set up located proximate to the at least one tagged asset, wherein the at least one independent survey set up monitors and measures the at least one tagged asset and connects to a receiver/transmitter for transmitting monitored and measured information that includes images and measurements of the at least one tagged asset, and is configured to receive commands from the administrative processor;
c. at least one client device having a display, the at least one client device connected to the network to display the images and measurements of the at least one tagged asset from the at least one independent survey set up in a layered coordinate system view with icons;
d. computer instructions in the administrative data storage instructing the administrative processor to create a customer profile and store the customer profile in the administrative data storage, the customer profile comprising: a customer name, a physical asset name, a named tagged asset, and a tagged asset location in a customer designated coordinate system of the named physical asset;
e. computer instructions in the administrative data storage to instruct the administrative processor to:
  (i) integrate the named tagged asset with the tagged asset location and the customer designated coordinate system of the named physical asset into a point cloud registration viewer; and
  (ii) generate a plan for monitoring and measuring the at least one tagged asset of using the point cloud registration viewer and using the at least one independent survey set up while simultaneously generating the layered coordinate system view with icons that includes the named tagged asset, the layered coordinate system view with icons formed by layering a location of the at least one independent survey set up on top of the customer designated coordinate system for the named physical asset with the tagged asset of the at least one tagged asset, wherein the at least one independent survey set up is linked to a library of survey set ups in the administrative data storage;
f. computer instructions in the administrative data storage to link an icon of tagged assets to the at least one independent survey set up, wherein the at least one independent survey set up monitors and measures the at least one tagged asset, the at least one independent survey set up comprising:
  (i) at least one data capture device comprising at least one of: a laser scanner and a camera, wherein the camera is at least one of: an infrared camera, a video camera, a high dynamic range camera, and a still camera;
  (ii) a survey set up processor connected to the at least one data capture device; and
  (iii) a survey set up data storage connected to the survey set up processor;
g. computer instructions in the administrative data storage to instruct the administrative processor to link the icon of tagged assets to a 360 degree panoramic view enabling a user to view at least one of: a 2D visual representation and a 3D visual representation of the at least one tagged asset; and
h. computer instructions in the administrative data storage to instruct the administrative processor to connect the icon of the tagged assets to a library of tagged assets stored in the customer profile, the library of tagged assets comprising a plurality of asset names and specification information on the at least one tagged asset, the icon of tagged assets having at least one of: a hyperlink, a video link, and a pictorial link to engage a data source connected to the network.

2. The system of claim 1, comprising computer instructions to instruct the administrative processor to export all or a portion of the layered coordinate system view with icons to the at least one client device via the network.

3. The system of claim 1, wherein the at least one data capture device comprises the at least one camera directed at the at least one tagged asset to provide stereoscopic images of the at least one tagged asset using the at least one camera positioned at a different height from another camera for the at least one independent survey set up and computer instructions in the administrative data storage to instruct the administrative processor to capture and calibrate the camera images within the layered coordinate system view with icons enabling the user to take measurements of the at least one tagged asset using the at least one client device remote to the at least one physical asset.

4. The system of claim 1, wherein the at least one independent survey set up is mounted for dynamic survey measurement of the at least one tagged asset with the at least one independent survey set up mounted to at least one of: a remotely operated vehicle (ROV), an unmanned aerial vehicle (UAV), an unmanned surface vehicles, and an autonomous underwater vehicle (AUV).

5. The system of claim 1, comprising virtual reality goggles connected to the network for receiving and displaying the layered coordinate system view with icons enabling the user to walk around the at least one tagged asset and to move from one icon to another icon in the layered coordinate system view with icons.

6. The system of claim 1, comprising computer instructions enabling the user with the at least one client device to draw a polygon on a portion of the layered coordinate system view with icons and then zoom in on all or a portion of the at least one tagged asset contained in the drawn polygon, the drawn polygon linking to data in the library of tagged assets.

7. The system of claim 1, comprising computer instructions to provide individual user profiles within the customer profile, the individual user profiles comprising at least one of: a user name, an access restriction, and contact information.

8. The system of claim 7, comprising computer instructions in the administrative data storage to instruct the administrative processor to provide bidirectional communication between the individual user profiles within the customer profile.

9. The system of claim 1, comprising computer instructions in the administrative data storage to instruct the administrative processor with a third party data storage to import at least one GIS mapping indicator or images from a third party processor connected to the network linking the at least one GIS mapping indicator into the layered coordinate system view with the icons to display at least one of: a precise a geographic indicator or a precise geographic anomaly proximate to the at least one tagged asset.

10. The system of claim 1, comprising computer instructions in the administrative data storage to instruct the administrative processor to connect to a customer processor with a customer data storage containing existing survey set up information and importing the existing survey set up information for the at least one tagged asset into the layered coordinate system view with icons.

11. The system of claim 1, comprising computer instructions in the administrative data storage to instruct the administrative processor to provide an encrypted communication from the administrative processor to the at least one independent survey set up to the administrative processor.

12. The system of claim 1, comprising computer instructions in the administrative data storage to instruct the administrative processor to create at least one memory tag for the at least one tagged asset or for the at least one independent survey setup, the at least one memory tag comprising user defined data on the at least one tagged asset.

13. The system of claim 12, wherein the at least one memory tag can be an RFID tag or a virtual memory tag.

14. The system of claim 1, comprising computer instructions in the administrative data storage to instruct the administrative processor to generate user customizable reports configured to interface with the user having the at least one client device to select and generate a report with user identified charts and user identified graphs for measured data from the at least one tagged asset on the at least one physical asset.

15. The system of claim 1, wherein the library of survey set ups comprises:
 a. independent survey set up identifiers;
 b. data capture device identifier codes
 c. transmission connection descriptions that indicate how the at least one data capture device can transmit the data to the network;
 d. information on a time line of the at least one data capture device;
 e. the customer name; and
 f. the physical asset name.

16. The system of claim 1, wherein the at one individual survey set comprises: at least one physical property sensor comprising: a sonar device, a temperature sensor, a pressure sensor, an accelerometer, a strain gauge, a salinity detector, a corrosion monitor, a motion detector for at least one of pitch, yaw, roll and heave, a curvature sensor, a magnetic field sensor, an ultrasonic flow sensor, a fluid or material thickness sensor, a humidity sensor, an infrared frequency detector, and an electrical current sensor.

17. The system of claim 1, comprising a support member for supporting the at least one data capture device, the survey set up processor, and the survey set up data storage enabling static data collection on the at least one physical asset for the at least one tagged asset.

* * * * *